(12) United States Patent
Naterer et al.

(10) Patent No.: US 7,587,895 B2
(45) Date of Patent: Sep. 15, 2009

(54) MICRO HEAT ENGINE AND METHOD OF MANUFACTURING

(75) Inventors: Gregory Frank Naterer, Oshawa (CA); Peter Stephen Glockner, Winnipeg (CA)

(73) Assignee: University of Manitoba, Winnipeg (CA)

( * ) Notice: Subject to any disclaimer, the term of this patent is extended or adjusted under 35 U.S.C. 154(b) by 54 days.

(21) Appl. No.: 11/815,448

(22) PCT Filed: Feb. 3, 2006

(86) PCT No.: PCT/CA2006/000149

§ 371 (c)(1),
(2), (4) Date: Jan. 25, 2008

(87) PCT Pub. No.: WO2006/081674

PCT Pub. Date: Aug. 10, 2006

(65) Prior Publication Data

US 2008/0202114 A1 Aug. 28, 2008

(51) Int. Cl.
*F01B 29/10* (2006.01)
(52) U.S. Cl. .................. 60/512; 60/515; 310/324; 29/25.35
(58) Field of Classification Search .......... 60/508, 60/512, 515; 310/324; 29/25.35
See application file for complete search history.

(56) References Cited

U.S. PATENT DOCUMENTS

| 6,978,611 | B1 | 12/2005 | Landis | |
|---|---|---|---|---|
| 7,010,854 | B2* | 3/2006 | Eldridge et al. | 29/832 |
| 7,208,021 | B1* | 4/2007 | Vardosanidze et al. | 29/25.02 |
| 7,235,914 | B2* | 6/2007 | Richards et al. | 310/328 |
| 7,464,459 | B1* | 12/2008 | Niblock et al. | 29/622 |
| 7,504,909 | B2* | 3/2009 | Tada | 333/186 |
| 2002/0043895 | A1 | 4/2002 | Richards et al. | |

OTHER PUBLICATIONS

P. Dutta, A. Beskok and T. C. Warburton, "Electroosmotic Flow Control in Complex Microgeometries", Journal of Microelectromechanical Systems, vol. 11, No. 1, pp. 36-44, 2002.
J. Voldman, M. L. Gray and M. A. Schmidt, "An Integrated Liquid Mixer / Valve", Journal of Microelectromechanical Systems, vol. 9, No. 3, pp. 295-302, 2000.
N. Vandelli, D. Wroblewski, M. Velonis and T. Bifano, "Development of a MEMES Microvalve Array for Fluid Flow Control", Journal of Microelectromechanical Systems, vol. 7, No. 4, pp. 395-403, 1998.
Kim, C. J., "Microfluidics Using the Surface Tension Force in Microscale", SPIE Symposium on Micromachining and Microfabrication, vol. 4177, pp. 49-55, Santa Clara, CA, Sep. 2000.

(Continued)

*Primary Examiner*—Hoang M Nguyen
(74) *Attorney, Agent, or Firm*—Nixon Peabody LLP

(57) ABSTRACT

The present invention relates generally to micro heat engines (MHEs) and methods of manufacture. More particularly, the present invention relates to an MHE including a substrate having a sealed microchannel for operatively containing a liquid droplet within the microchannel and a thermal bridge for providing a heat source or heat sink to the microchannel. The MHE also includes a piezoelectric sensor responsive to a pressure change within the microchannel to induce voltage across the piezoelectric sensor and a power output.

14 Claims, 10 Drawing Sheets

OTHER PUBLICATIONS

Naterer, G. F., "Reduced Flow of a Metastable Layer at a Two-Phase Limit", AIAA Journal, vol. 42, No. 5, pp. 980-987, 2004.

Tudos, A. J., Besselink, G. A. J., Schasfoot, R. B. M., "Trends in Miniaturized Total Analysis Systems for Point-of-Care Testing in Clinical Chemistry", Lab on a Clap, vol. 1, pp. 83-95, 2001.

Hirt, C. W., "Thermocapillary Sample Problems", Technical Report FSI-98-00-TN47, Flow Science Inc, Santa Fe, NM, Mar. 1998.

DeBar, M. J., Liepmann, D., "Fabrication and Performance Testing of a Steady Thermocapillary Pump with No Moving Parts", pp. 109-112, Proceedings of the Fifieenth IEEE International Conference on Micro Electro Mechanical Systems, Las Vegas, NV, Jan. 20-24, 2002.

M. Mala and D. Li, "Flow Characteristics of Water through Microtubes", International Journal of Heat and Fluid Flow, vol. 20, pp. 142-148, 1999.

Naterer, G. F., Glockner, P. S., Chomokovsli, S. R., Richardson, G., Venn, G., "Surface Micro-Grooves for Near-Wall Exergy and Flow Control: Application to Aircraft Intake De-icing" (in press), Journal of Micromechanics and Microengineering, 2004.

W. Qu, M. Mala and D. Li, "Pressure-Driven Water Flows in Trapezoidal Silicon Microchannels", International Journal of Hear and Mass Transfer, vol. 43, pp. 353-364, 2000.

Naterer, G. F., "Adaptive Surface Micro-Profiling for Microfluidic Energy Conversion", 35 AIAA Journal of Thermophysics and Heat Transfer, vol. 18, No. 4, pp. 494-501, 2004.

Glockner, P, S., Naterer, G. F., "Near-Wall Velocity Profile with Adaptive Shape Functions for Turbulent Forced Convection" (in press), International Communications in Hear and Mass Transfer, 2004.

Sammarco, T. S., Burns, M. A., "Thermocapillary Pumping of Discrete Drops in 40 Microfabricated Analysis Devices", AlChE Journal, vol. 45, pp. 350-366, 1999.

Sammarco, T. S., Burns, M. A,, "Heat Transfer Analysis of Microfabricated Thermocapillary Pumping and Reaction Devices", Journal of Micromechanics and Microengineering, vol. 10, pp. 42-55, 2000.

Yang et al., "Eletrokinetic Microchannel battery by means of electrokinetic and microfluidic phenomena," Journal of Micromechanics and Microengineering, 2003 .

* cited by examiner

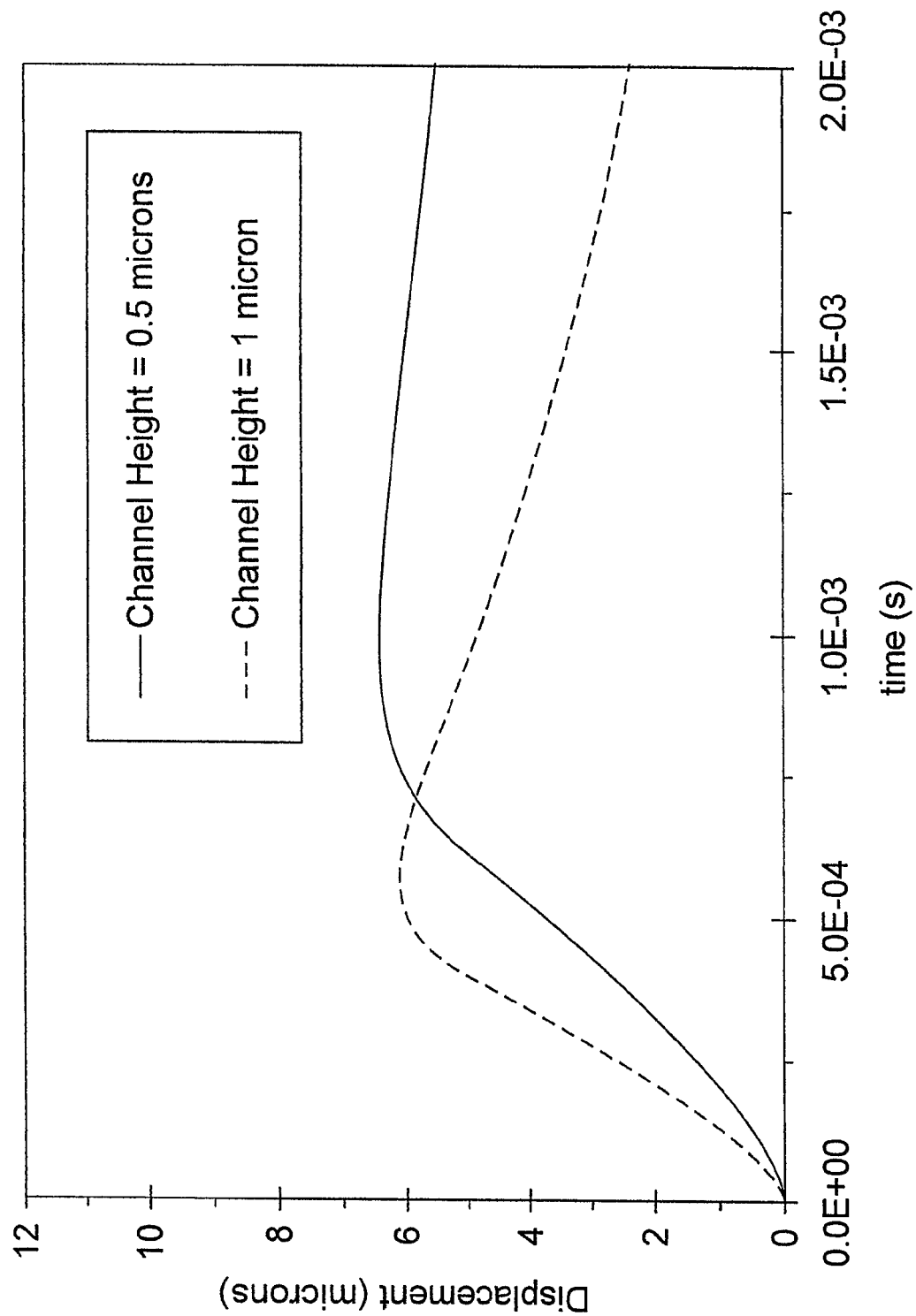
Figure 10: Predicted Droplet Displacement with Varying Channel Height

MICRO HEAT ENGINE AND METHOD OF MANUFACTURING

FIELD OF THE INVENTION

The present invention relates generally to micro heat engines (MHEs) and methods of manufacture. More particularly, the present invention relates to an MHE including a substrate having a sealed microchannel for operatively containing a liquid droplet within the microchannel and a thermal bridge for providing a heat source or heat sink to the microchannel. The MHE also includes a piezoelectric sensor responsive to a pressure change within the microchannel to induce a voltage across the piezoelectric sensor and a power output.

BACKGROUND OF THE INVENTION

At the present time, there is considerable effort and interest in advanced miniaturization including the development of ultra small sensors, power sources, communication, navigation and propulsion systems.

In particular, micro heat engines (MHEs) driven by renewable energy sources have promising potential in numerous applications such as portable power generation, micro energy sources, waste heat recovery, fluid control, propulsion, cooling systems for electronics and people, and a variety of other applications. For example, one of the most beneficial applications of a micro heat engine would be to replace batteries as a means to power electronics. As is well known, with people's increasing dependence on portable electronics, batteries continue to be problematic in terms of their bulk, cost and the amount of power they are able to generate. Often, the batteries used in cell phones, laptop computers and digital cameras are not powerful enough to drive the many features now available in these devices for a reasonable length of time and as a result, there continues to be a need for alternate portable power supplies. Such systems could avoid the need of conventional batteries to re-charge (or be disposed of) by generating sufficient power (tens of watts of power) from solar energy or other heat supplies.

Other examples of applications for micro heat engines may include the following: Tiny machines being developed with microtechnology are many times smaller than the batteries available to power them with the result that there is little economic incentive to produce micromachines as there are currently no correspondingly small power sources to match.

In fluid control, micro-engines could be embedded within surfaces for boundary layer and fluid control where, for example, pulsating micro-pistons or micro-tabs enabled by micro-engines beneath a heated surface could be used to delay boundary layer separation and reduce wall friction.

Still further, micro heat engines could be used as energy sources for micro air vehicles and sensors as well as producing electricity from waste heat emitted from various sources such as the surface of a computer case.

In all of these examples, clean energy sources can be used to provide the input power to the micro heat engine, without generating greenhouse gases.

By way of comparison, to conventional macro-scale power generation systems, a conventional gas turbine generator with a 1 m diameter air intake area can generate power on the order of 100 MW. In theory, by scaling a conventional gas turbine system down to a millimeter size and maintaining a similar power per unit of airflow, tens of watts of could be produced from an MHE to meet the power requirements of many applications.

As a result, it is anticipated that an MHE could achieve close to the same level of specific power as a macro-scale engine, and possibly at an equivalent cost per unit output with future micro-machining advances. It is advantageous that within such a system, renewable energy sources could be better utilized.

However, it is also known that the energy and fluid transport processes influencing the design of any micro-components change appreciably from a macro to micro scale, i.e., friction, thermocapillary and other forces. In particular, the fabrication of micro turbomachinery for heat engines poses several challenges including the difficulty of creating detailed features at micron-scales, stresses on highly loaded parts and assembly and packaging. Also, current fabrication techniques cannot precisely duplicate the 3-D geometries encountered in macro-scale turbomachinery, so machine design becomes increasingly difficult when scaled-down versions of conventional devices cannot be constructed.

Still further, as the physical dimensions of microdevices decrease, surface and electromagnetic effects become increasingly significant relative to gravitational, inertial and viscous forces on the fluid. Electric charge patterns along the walls of a microchannel can be manipulated to control electromagnetic forces and fluid transport through a microdevice [1]. Voldman et al. [2] have developed a cantilever-plate flapper microdevice for controlling fluid motion through a microvalve. The device permits mixing and throttling capabilities, simultaneously. Scalable control of microfluidic transport has been implemented with microvalves fabricated in parallel arrays [3]. It was reported that effective control of flow rates up to 150 ml/min with a pressure differential of 10 kPa could by achieved within the microsystem.

An increasingly important microfluidic force affecting the fluid motion is surface tension. Kim [4] documents how surface tension forces can be effectively utilized and controlled in microfluidic transport processes. Thermocapillary pumping (TCP) is a non-mechanical, surface-tension driven pumping system for moving discrete liquid droplets in Microsystems. The small length scales of microdevices lend themselves well to flow control with thermocapillary pumping. A spatial temperature gradient within the microchannel generates a difference of surface tension and pressure across the droplet. The resulting pressure gradient causes the droplet to accelerate in the direction of lower pressure, similar to Poiseuille flow in a tube. In addition to Poiseuille flow characteristics, this article reports that additional re-circulation near the walls contributes to droplet acceleration. Unlike other applications involving dispersed droplet transport such as multiphase icing problems [5, 6], this article solves the full Navier-Stokes equations to predict internal motion within the droplet.

TCP has been applied to lab-on-a-chip technology. For example, blood and urine samples are typically sent to labs to be analyzed by various processes and results from the sample may talk several days. Additionally, errors such as mislabelling and lost samples may hamper with processing of data [7]. A lab-on-a-chip is a compact point-of-care clinical testing device, whereby all operations can be performed instantly on a small chip. Nanoliter samples of fluid can be transported within the chip to various processing stages using TCP. Since the fluid does not contact any physical pumping mechanism, there is no opportunity for a sample to become contaminated. Unlike conventional micro-pumps, another advantage of TCP is that it can move fluid in either direction, depending on the location of the surface heat source.

In addition to the lab-on-a-chip, another innovative TCP application involves optical fibres, when a small moving micro-droplet can re-direct a light beam by refraction or reflection to a different path [8]. Once the beam enters the fiber, it can be trapped by these internal reflections. Thermocapillary transport can be used as an optical "switch" to re-direct light from one fiber to another fiber. More specifically, the droplet in the microchannel would intersect the fiber-optic light beam. When the micro-droplet moves to the position of the intersecting light beam, the beam is reflected to a different fiber. Recent numerical studies involving FLOW-3D simulations [8] have utilized thermocapillary convection in a 14-micron channel (heated at the bottom boundary) for optical fiber applications.

DeBar and Liepmann [9] have manufactured and tested silicon and quartz thermocapillary pumps with a square cross-sectional area. Three heaters were used, with one heater to generate a fluid-vapor interface and two other heaters to control the spatial temperature gradient. The pumps were operated under a variety of conditions, in order to evaluate performance characteristics. These studies considered a square cross-sectional area, while other past studies have investigated other types of geometrical profiles, such as circular microtubes [10], surface micro-grooves [11], trapezoidal microchannels [12] and open rectangular microchannels [13]. In parallel channels, Glockner and Naterer [14] have shown that Reichhardt's Law can be effectively applied over multiple regions in the near-wall layer.

Sammarco and Burns [15] describe how TCP can be used to pump small volumes of fluid within a microfabricated flow channel. TCP velocities up to 20 mm/min were measured for toluene ($\Delta T \approx 26°$ C.), with temperature differences ranging from 10° C. (5 V) to 70° C. (18 V) for mineral oil. Experiments yielded TCP velocities that were comparable to theoretical expressions derived for the TCP velocity [15]. A subsequent paper by the same authors [16] describes a heat transfer analysis of TCP within the microchannel. The analysis investigates both fluid flow and energy transport to develop materials, designs and operational guidelines for effective pumping performance. For pumping velocities less than 0.1 cm/s, it was shown that a uniform interface temperature is possible, when pumping water across a fused silica substrate within a glass microchannel.

Predictions of TCP within a closed microchannel differ from an open microchannel, since the external pressure upstream and downstream of the droplet cannot be assumed equal. This pressure difference must be included in the analysis. Large droplet velocities reported in past TCP studies with open channels cannot be obtained in a closed microchannel, as small droplet displacements create an opposing pressure gradient in the gas phase with a similar magnitude as the thermocapillary pressure. Also, open-channel assumptions of steady-state Poiseuille flow are not fully applicable in closed microchannels, when cyclic heat input generates periodic acceleration and deceleration of the droplet. This discussion develops numerical and analytical formulations under these cyclic conditions. A detailed two-dimensional transient flow solution is developed to predict the detailed pressure and velocity changes in a new TCP application.

Other past work has included the work of researchers at Washington State University (D. Bahr, B. Richards, C. Richards) who built a micro heat engine for military applications. However, this system requires fuel for continuous operation.

Researchers at the University of Alberta (D. Kwok, L. Kostiuk) have also built a micro engine that generates electricity from microfluidic motion. This system requires pressurized water and a micro-turbopump. In another design, this group has also designed a microfluidic engine that uses water forced through a glass micro-channel to produce a streaming electric current by pushing positively charged ions, collected in the water at the boundary of the micro-channel, in the direction of the water current.

The literature has also revealed *Electrokinetic microchannel battery by means of electrokinetic and microfluidic phenomena*, published in 2003 in the Journal of Micromechanics and Microengineering by Yang et al.

A review of the patent literature has revealed US patent application No. 2002/0043895 which describes a piezo-electric micro-transducer. In one example, a working fluid operating as a saturated liquid-vapour mixture is heated and cooled by switches selectively coupled to a heat source for flexing the transducer. In other examples vibrations from a moving body, a pulsating pressurized fluid flow or combustion of fuel and an oxidizer mixture provide the flexing movement of the transducer.

As a result, there remains a need for systems that enables the operation of an MHE from any suitable latent heat input such as renewable solar energy or waste heat and that does not require micro machinery.

SUMMARY OF THE INVENTION

It is an object of the present invention to obviate or mitigate at least one disadvantage of previous systems.

In accordance with the invention, there is provided a micro heat engine comprising: a substrate having a sealed microchannel, the microchannel having a first end and a second end; a liquid operatively contained within the microchannel between the first and second ends, thereby defining a first gas chamber adjacent the first end and a second gas chamber adjacent the second end; a thermal bridge in operative communication with the first gas chamber for providing a thermal gradient to the first gas chamber; and a piezoelectric sensor in operative communication with the second gas chamber, the piezoelectric sensor responsive to a pressure change within the second gas chamber to induce a voltage across the piezoelectric sensor and a power output.

The invention also provides a process for manufacturing a micro heat engine comprising the steps of: a) etching a microchannel having a first end and a second end on a first side of a substrate; etching a thermal bridge recess on a second side the substrate adjacent the first end of the microchannel; etching a piezoelectric recess on the second side of the substrate adjacent the second end of the microchannel; etching a droplet filling channel on the second side of the substrate; b) operatively attaching a thermal bridge to the thermal bridge recess, and piezoelectric sensor to the piezoelectric recess; and, c) filling and sealing the microchannel.

BRIEF DESCRIPTION OF THE DRAWINGS

Embodiments of the present invention will now be described, by way of example only, with reference to the attached Figures, wherein:

FIG. 10 is a graph showing predicted droplet displacement with varying channel height.

DETAILED DESCRIPTION

With reference to the Figures, a micro heat engine (MHE) and method of manufacture is described. The MHE operates through thermocapillary pumping to generate electrical power through the cyclical compression of gas against a flexible piezoelectric membrane or sensor.

Figure 1:
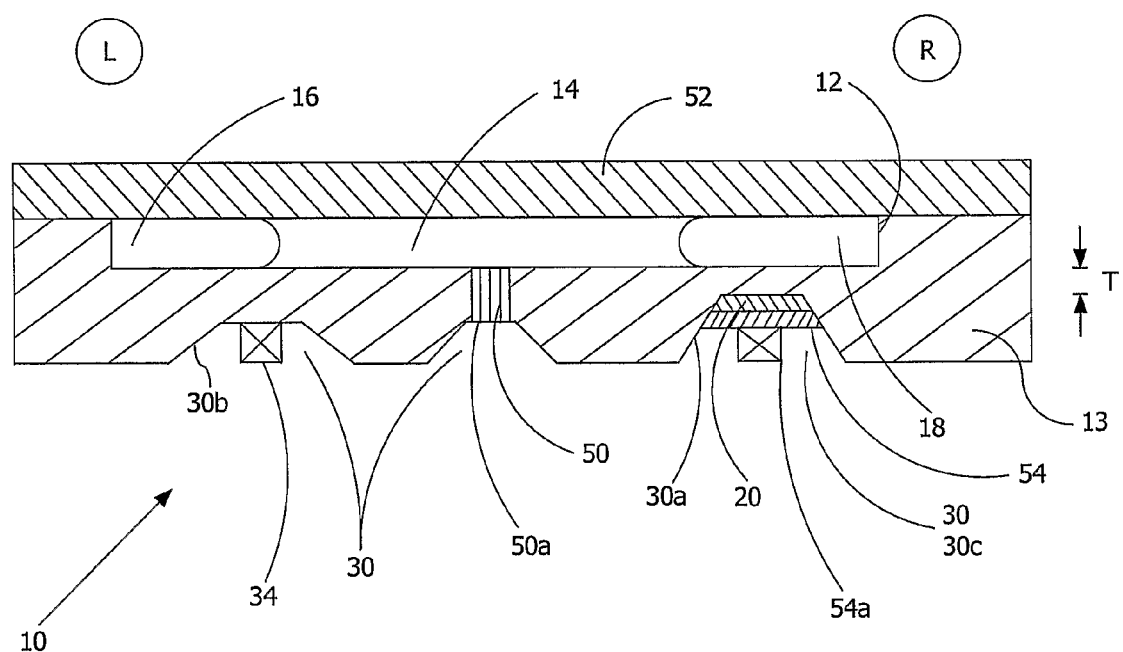
FIG. 1 is a schematic side view of one embodiment of a micro heat engine in accordance with the invention.

As shown in FIG. 1, the micro heat engine 10 includes a micro-channel 12 within a substrate 13 containing a partial volume of fluid 14 separating two gas chambers 16 and 18 on opposite sides L and R of the micro-channel. A source of heat (or absence of heat) provides a thermal gradient to one side L or R of the microchannel 12. A piezo-electro membrane or sensor 20 is operatively connected to one or both sides L or R of the microchannel 12.

Within the context of this description, it is understood that the driving force for the MHE is the application of a thermal gradient to one side of the microchannel that is not applied to the opposite side at the same time. In addition, this description is written as describing the application of a heat source to the L side of the micro-channel, however, it is understood that a heat sink at side L may provide the thermal gradient and, hence, the driving force for the MHE. Furthermore, within the context of this description, thermocapillary pumping refers to fluid motion induced by temperature-dependent variations of surface tension within a liquid, as well as different contact angles, which contribute to an effective pressure gradient.

The micro heat engine produces energy through thermocapillary pumping. Generally, the MHE converts heat input at side L of the micro-channel to electrical power output at side R. When heat is applied at the L side, the pressure in gas chamber 16 and gas chamber 18 increases, thereby pushing on the flexible piezoelectric membrane 20 at the other side R, where an electrical voltage is created. The heat input at side L is then turned off which causes a relaxation in pressure in gas chambers 16 and 18 as heat is transferred from the system. By cycling the heat input, a continuous flexing and relaxation of piezo-electric membrane 20 is enabled to produce usable power. For practical applications, many such micro-channels are constructed in parallel, so that the magnitude of power output is increased to usable levels. During droplet deflection, the pressure in the left chamber decreases, while the pressure in the right chamber increases.

Manufacture

Figure 2:
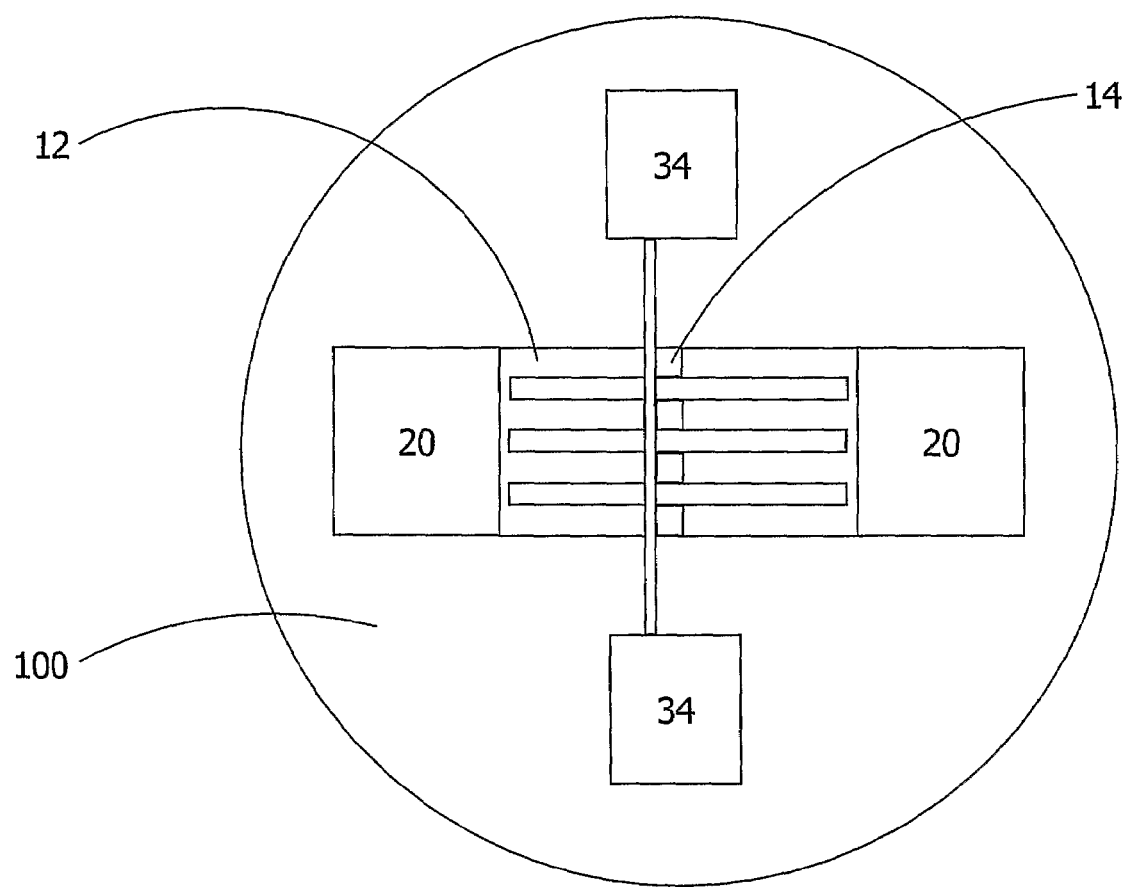
FIG. 2 is a schematic plan view of one embodiment of a micro heat engine in accordance with the invention having multiple interconnected microchannels.

The MHE is manufactured using the following general protocol and with reference to FIGS. 1-2. It is understood that different designs of MHEs may be manufactured utilizing the general techniques described herein. For example, MHE designs may include designs or features having multiple interconnected microchannels 12 as shown in FIG. 2, different heat sink, piezoelectric 20 and electrode manufacture and assembly techniques, and/or different sealing or droplet insertion methodologies as understood by those skilled in the art. Generally, the process includes the formation and assembly on an appropriate substrate backside trenches 30, frontside microchannels 14, backside thermal bridge 34, electrodes 36, microchannel sealing, droplet insertion and piezoelectric membrane 20 assembly.

Substrate

The MHE is manufactured from an appropriate substrate 100 such as a silicon wafer with an approximate 500 microns thickness. After basic surface preparation, the substrate is subjected to a series of lithography, etching and deposition techniques to create the microchannels, backside trenches thermal bridge and electrodes on the substrate.

Backside Trenches

Initially, photoresist is applied to the frontside and backside surfaces of the substrate. Appropriate backside masks defining the desired trench patterns are applied and the backside is exposed to UV light. The photoresist is developed, baked and etched with an appropriate etching agent with protection provided to the frontside. After etching, the backside photoresist is removed and dried.

Frontside Microchannels

The frontside microchannels are prepared using similar methodologies to those described for the backside trenches. Generally, photoresist is applied to the frontside and baked. An appropriate frontside mask is applied and the frontside is exposed to UV light. The photoresist is developed, baked and etched. After etching, the photoresist is removed and dried.

Etching

Etching the backside trenches and frontside microchannels may utilize different etching techniques to ensure the appropriate cross-sectional geometry of the trenches and microchannels respectively. For example, the backside trenches that do not require perpendicular walls may be etched using standard potassium hydroxide (KOH) etching to provide an inwardly tapering trench 30*a*, whereas the microchannels may be etched using plasma etching to create a more perpendicular cross-sectional profile.

In one embodiment, subsequent droplet insertion may require a droplet filling channel 50 to be incorporated through the substrate. Creating the droplet filling channel may require additional lithography and etching techniques during or after backside trench or microchannel formation. Similarly, a droplet filling channel may be incorporated through the top surface 52 (described below)

Backside Thermal Bridge

The backside thermal bridge 34 is bonded to the substrate within the thermal bridge trench 30*b* by depositing an appropriate heat conductive material within the trenches utilizing further lithography, etching and deposition techniques as are known. Suitable thermal bridge metals or alloys may include chrome, aluminum and others.

Piezoelectric Membrane

The piezoelectric membrane 20 is preferably formed by solution casting a membrane onto the MHE in the piezoelectric trench 30*c* adjacent one end of the microchannel. As shown in FIG. 1, the piezo-electric membrane is solution cast to a desired thickness at the bottom of one backside trench adjacent the right side of the microchannel. In this embodiment, the backside trench is etched to a depth relative to the microchannel leaving a thickness, T, in the substrate sufficiently thin to permit meaningful deflection of the substrate in response to an increase in pressure within the microchannel. In a preferred embodiment, the piezoelectric membrane is formed from a solution of Pb, Zr and Ti in a proper stoichiometric ratio and solvent. After solution casting, solvent is removed by baking. The solution casting process may be repeated until an appropriate thickness of the piezoelectric membrane is formed.

Electrodes

Electrodes 54, 54a are configured to the piezoelectric membrane by further lithography and deposition techniques as are known. Gold, titanium, platinum and other metals or alloys may be used as electrodes.

Top Surface Sealing

The top surface of the microchannels are sealed preferably using a glass cap 52 that is anodically bonded to upper surface of the substrate.

Droplet Insertion and Final Sealing

After the top surfaces of the microchannels have been sealed against the substrate, droplets 14 must be installed within the microchannels. In one embodiment, droplets are drawn into the channels by capillary forces. Carbon dioxide or other suitable gases may be used to first fill the channels to aid imbibation. The use of a gas may also aid in the formation of one continuous droplet, rather than several smaller droplets separated by air gaps.

In another embodiment, droplets are drawn into the microchannels by temperature induced pressure gradients. In this embodiment, the substrate is heated to an appropriate temperature and placed in contact with a liquid source, whereby through controlled cooling of the substrate, the droplet volume is drawn into the microchannel.

After the droplet has been inserted in the microchannel, final sealing of the filling hole 50 is required by an appropriate sealing agent 50a such as a wax or epoxy.

Heat Source Cycling

In order to effectively cause droplet movement within the microchannel, rapid cycling of the heat source is required by bringing a heat source in and out of contact with the thermal bridge.

In one embodiment of a thermal switch, tabs (not shown) underneath the substrate would be made out of a piezoelectric material. The uncharged state of the tabs would have the thermal bridge in contact with the heat source (heat stage). After the droplet has been sufficiently displaced, a small voltage would cause the tabs to flex (like a cantilever) or elongate to push the substrate away from the thermal bridge. When the external voltage is removed, the deflection would remain, keeping the heat source out of contact with the thermal bridge. When the droplet has retuned sufficiently, the circuit could be closed, allowing the tabs to return to their uncharged state (un-flexed) and bringing the thermal bridge back into contact with the heat source, commencing another heating cycle. Some of the energy that was stored in the tabs while flexed could be recovered to improve efficiency.

The above concept could also work in reverse, where the uncharged state of the tab would have the thermal bridge out of contact with the heat source. By reversing the polarity of the voltage, the tabs would contract when charged and bring the thermal bridge into contact with the heat source to initiate the heating cycle.

OTHER EMBODIMENTS

As noted above, the heat engine could also be activated by a heat sink, rather than a heat source. The thermal bridge would cool the advancing end of the droplet, rather than heating the receding end of the droplet. No changes would be required to the numerical code or the physical embodiment of the micro heat engine.

In the embodiment shown in FIG. 2, a series of interconnected microchannels may be provided in which a single piezoelectric membrane 20 communicates with several microchannels. In this embodiment, each microchannel 12 would have its own droplet 14 and each would be subjected to the same thermal gradient at the same time during operation.

A still further embodiment would be the incorporation of one or more piezoelectric sensors at both ends of the microchannel in order to capture energy through both the positive and negative flexure of either or both piezoelectric sensors in response to the movement of the droplet.

A further analysis and discussion of the invention is provided in which the following nomenclature is used.

| | Nomenclature |
|---|---|
| A | interfacial area ($m^2$) |
| B | surface tension constant |
| $c_p$ | specific heat (J/kgK) |
| F | force (N) |
| G | microchannel constant |
| h | convection coefficient ($W/m^2K$) |
| H | microchannel height (m) |
| i | row number |
| j | column number |
| k | thermal conductivity (W/mK) |
| m | mass of droplet (kg) |
| P | pressure (Pa) |
| Pe | Peclet number (vH/a) |
| q" | heat flux ($W/m^2$) |
| S | source term |
| t | time (s) |
| T | temperature (K) |
| u | x-velocity component (m/s) |
| v | y-velocity component (m/s) |
| V | volume ($m^3$) |
| x, y | Cartesian coordinates (m) |
| | Greek |
| $\alpha$ | thermal diffusivity ($m^2/s$) |
| $\mu$ | dynamic viscosity (kg/ms) |
| $\theta$ | contact angle (rads) |
| $\rho$ | density ($kg/m^3$) |
| $\sigma$ | surface tension (N/m) |
| | Subscripts |
| A | air |
| b | bulk |
| c | capillary |
| D | droplet |
| f | friction |
| i | initial |
| L | left edge |
| o | surroundings |
| R | right edge |
| s | droplet/air interface |
| T | temperature |
| v | velocity |
| | Superscripts |
| o | previous iteration or time step |

Thermocapillary Pumping with Cyclic Heat Source

Thermocapillary pumping is a non-mechanical method of fluid pumping that takes advantage of temperature-dependent changes of fluid surface tension. Thermocapillary pumping is driven by internal pressure differences resulting from surface tension variations at the ends of a discrete droplet, due to an applied temperature gradient. Consider a droplet enclosed within a closed microchannel (see FIG. 3). Heat is transferred through a thermal bridge across a substrate from a stationary cyclic source, which turns on/off to control thermocapillary transport of the enclosed micro-droplet. During heat input, thermocapillary forces induce fluid motion from left to right. Heat transfer to an end of the droplet leads to temperature variations within the liquid. Thermocapillary pumping arises when such variations and differences between contact angles at both ends contribute to an effective pressure difference across the liquid. This difference induces fluid motion within the microchannel. When the droplet moves from left to right (see FIG. 3), the air pressure increases in the right section of the microchannel. During the cooling period when the heat source is turned off, this air pressure drives fluid motion back towards the initial equilibrium position of the droplet. The cyclic heat source can be connected to several microchannels in parallel (see FIG. 4). In this way, microfluidic transport within a larger network of microchannels can be effectively controlled by TCP.

Figure 3:
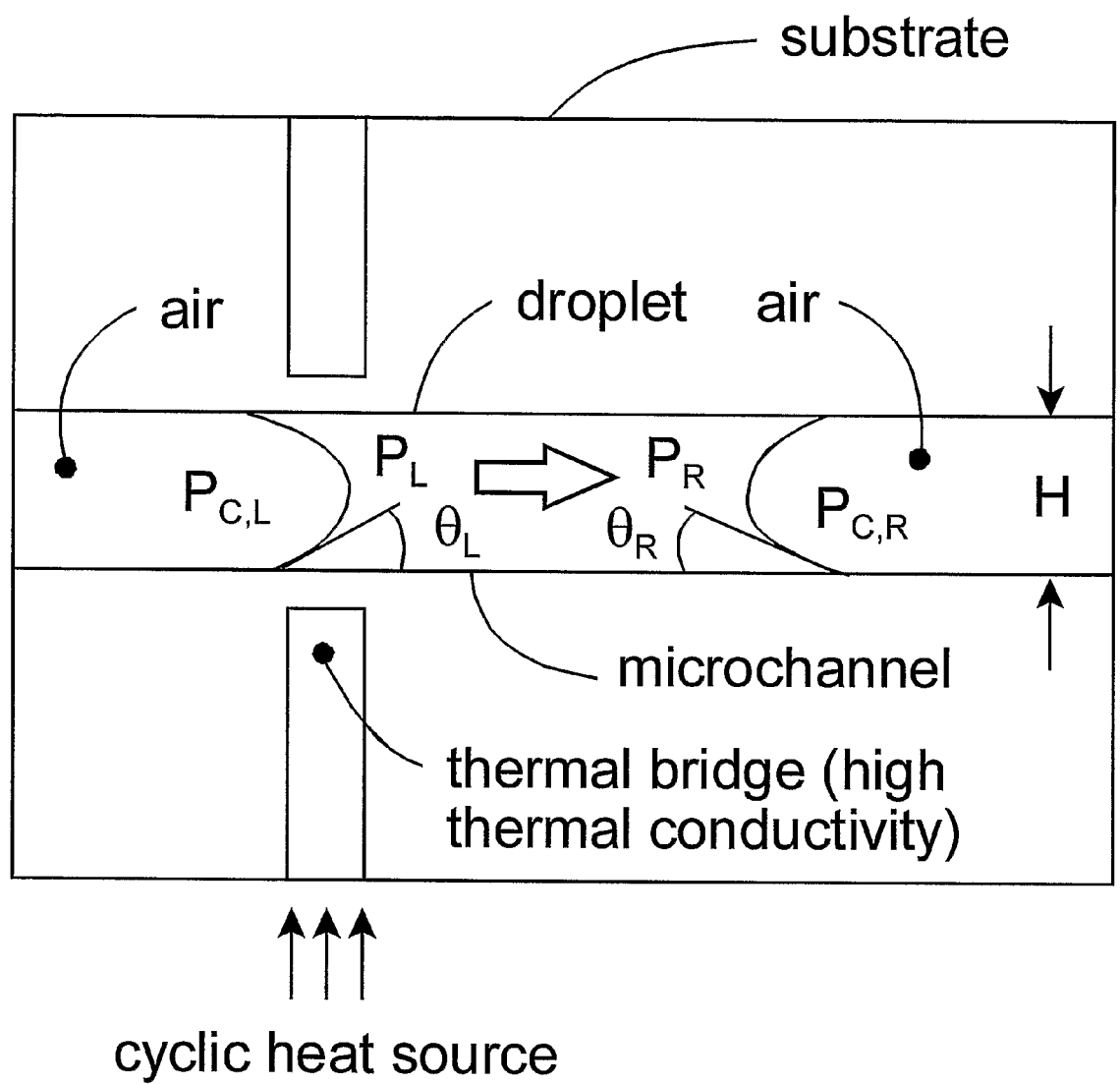
FIG. 3 is a schematic of thermocapillary pumping.
Figure 4:
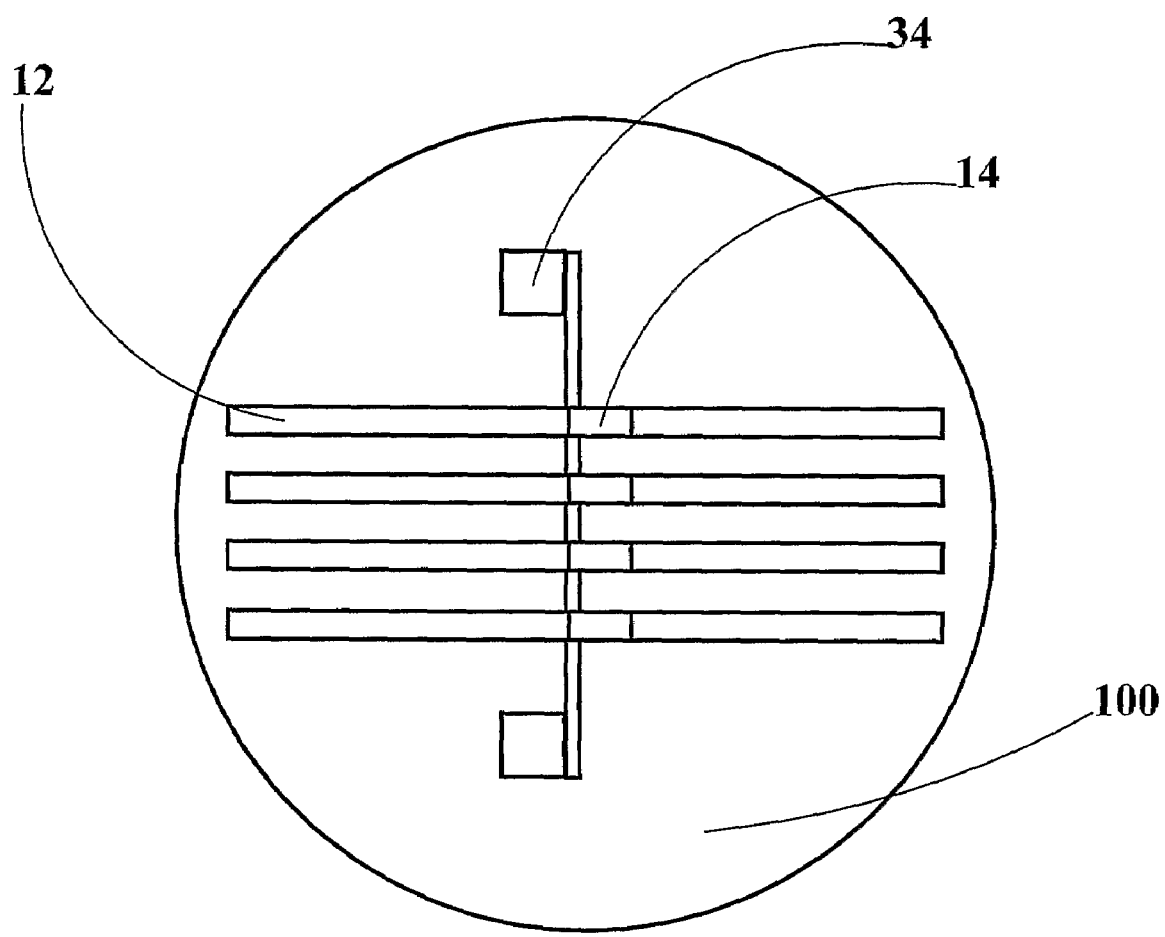
FIG. 4 is a schematic plan view of multiple closed microchannels heated in a parallel circuit.

Internal fluid motion is governed by the Navier-Stokes equations, subject to appropriate boundary pressures at both ends of the droplet. An external pressure is generated when the droplet moves in the micochannel. In practical applications, the external pressure can be used when triggering a sensor, activating a switch or operating a flow control device in a microdevice. In FIG. 3, the pressure difference across the droplet due to the temperature gradient can be expressed in the following way, $$\Delta P_c = P_{c,R} - P_{c,L} = G\left[\left(\frac{\sigma \cos\theta}{H}\right)_R - \left(\frac{\sigma \cos\theta}{H}\right)_L\right] \quad (1)$$

where $P_{c,L}$ is the capillary pressure on the left side of the droplet, $P_{c,R}$ is the capillary pressure on the right side of the droplet, $\theta$ is the contact angle between the liquid and solid wall and H is the channel height. Also, G is a constant (specific to the problem geometry). For example, G=4 for a circular microtube, G=2 for slit-like microchannels and G=2(1+ height/width) for square and rectangular microchannels.

In multiphase systems with droplets, the droplet is hydrophilic if the droplet is the wetting fluid ($\theta<90°$). On the other, the droplet is considered hydrophobic if the surrounding fluid is the wetting fluid ($\theta>90°$). In FIG. 3, $\theta$ is the contact angle measured through the droplet and P represents pressure. The subscripts L and R refer to the left and right edges of the droplet, respectively. The contact angle is measured through the fluid of interest. If the contact angle is measured through the wetting fluid, it is always less than 90 degrees.

The surface tension along the receding meniscus of the droplet in FIG. 3 decreases with increasing temperature. As a result, it decreases when the receding end of the droplet is heated, which lowers the capillary pressure and causes relaxation of the meniscus. This process is similar to applying less tension around the perimeter of a drum skin. A reduction of the contact angle slightly reduces the change in the capillary pressure that would be caused by a change in $\sigma$ alone. In order to maintain a constant droplet volume, the advancing contact angle ($\theta_R$) increases, thereby resulting in a decrease of interfacial capillary pressure and accompanying increase in $P_R$. The resulting internal pressure gradient within the droplet is initially reflected through a change in the shapes of the menisci at both receding and advancing edges of the droplet.

Thus, the initial result of heating the receding end of the droplet is a change of the droplet shape. Initial reluctance of the droplet to move when an end is heated is called "surface tension hysteresis". There exists a point, however, at which the advancing end of the droplet will stop deforming. At this point, the internal pressure of the receding end of the droplet will be larger than the internal pressure of the advancing end of the droplet. This internal pressure gradient drives the microfluidic motion during thermocapillary pumping.

The resulting pressure difference, due to the change of surface tension across the droplet, induces bulk motion internally within the liquid. The surface tension can be represented as follows, $$\sigma = A - BT \quad (2)$$

where A and B are constants (see Table 1 for different liquids).

TABLE 1

Surface Tension of Various Liquids [15]

| Liquid | A (dyn/cm) | B (dyn/cm/K) | B/µ (cm/sK) |
|---|---|---|---|
| Water | 75.83 | 0.1477 | 15.5 |
| Toluene | 30.9 | 0.1189 | 20.6 |
| Mineral Oil | 40.71 | 0.221 | 0.85 |
| H$_2$O$_2$ | 78.97 | 0.1549 | 12.4 |

A desirable feature of the working fluid is a high change of surface tension with temperature, which would generate the largest pressure difference for a given heat input. From Table 1, it appears that mineral oil has the highest coefficient of B (most desirable). But surface tension must overcome friction within the droplet. When divided by dynamic viscosity, toluene appears to become the most effective working fluid. For a given heat input, toluene will generate a high tension-induced pressure difference, in excess of a fixed frictional resistance within the liquid. Water, however, is only slightly inferior but is readily available and safe.

Due to the temperature dependence of surface tension, heat transfer within the droplet is considered. Although convection occurs within the droplet, the height of the droplet is much smaller than its length, so heat conduction is dominant in the axial direction. This lead to the development of a theoretical model in which the micro-droplet dynamics were predicted with a slug flow approximation (called the SF Model). Consider heating of two semi-infinite bodies in contact (the left being the left air/substrate region and the right being the droplet/substrate region) with the heater aligned at the receding edge of the droplet in FIG. 3. The sum of the two heat fluxes in both directions ($q''_{s,R}+q''_{s,L}$) must equal the total supplied heat flux ($q''_s$). The surface temperature at the interface can be approximated by [6]

$$T(0,t) = T_i + \frac{2q''_s(\alpha t/\pi)^{\frac{1}{2}}}{k} \quad (3)$$

Equating this result for the left (subscript L) and right sides (subscript R) of the interface, $$q''_{s,L} = \frac{q''_s(\alpha_R)^{\frac{1}{2}}/k_R}{(\alpha_L)^{\frac{1}{2}}/k_L + (\alpha_R)^{\frac{1}{2}}/k_R} \quad (4)$$

This heat flux allows the temperature distribution to be determined in the heating period.

During the cooling period after the droplet moves past the thermal bridge in FIG. 3, a lumped capacitance approximation can be used [6], thereby yielding a droplet temperature of $$T = T_o + (T_i - T_o)\exp\left[-\frac{hA_s t}{pVc_p}\right] \quad (5)$$

where $T_i$ is the droplet temperature at the beginning of the cooling period. Also, $A_s$ is the surface area exposed to the surroundings with a heat transfer coefficient of h and an average temperature of $T_o$. The value of h was approximated based on the temperature profile in Eq. (5). Using the temperature profiles in both the heating and cooling periods, the resulting variation of surface tension with temperature and net thermocapillary force can be determined from Eqs. (1)-(2).

In addition to thermocapillary forces, fluid friction and air pressure in FIG. 3 contribute to the net force on the droplet within the microchannel. Compression/expansion of the gas downstream/upstream of the droplet were predicted based on the ideal gas law (PV=mRT where R=287.0 J/kgK). The mass within each air region was calculated based on specified initial conditions, while the volume of each air region was determined from the droplet displacement over time.

Fluid friction on the micro-droplet was predicted with a slug flow approximation, which treats the droplet as a discrete slug without internal distortion. The frictional force imposed on the slug along the channel walls due to viscous stresses is determined from the steady-state velocity profile for Poiseuille flow, i.e., $$u = \frac{H^2}{2\mu}\frac{\partial P}{\partial x}\left[\left(\frac{y}{H}\right)^2 - \frac{y}{H}\right] \quad (6)$$

where $\partial P/\partial x$ is a specified (constant) pressure gradient.

The bulk velocity, $u_b$, may be determined by integration of Eq. (6) across the microchannel and dividing by H, thereby yielding $$u_b = \frac{H^2}{12\mu}\frac{\partial P}{\partial x} \quad (7)$$

With the value of $\partial P/\partial x$ solved from Eq. (7), the frictional force acting on the slug can be determined from the differentiated form of Eq. (6), after evaluating the expression at the wall and multiplying the result by both $\mu$ and the interfacial area between the droplet and substrate, $2\Delta x \cdot b$. As a result, the frictional force becomes $$F_f = -\frac{12}{H}\mu\Delta x b u_b \quad (8)$$

Combining the previous thermocapillary, air and friction forces yields a net force (F) acting on the droplet, which can be integrated temporally to give the following velocity and displacement, $$u = u^o + \frac{F\Delta t}{m} \quad (9)$$

$$x = x^o + u\Delta t \quad (10)$$

This SF Model neglects internal velocity variations within the droplet. In the following section, a numerical solution of the Navier-Stokes equations is developed, in order to provide additional insight regarding internal recirculation within the droplet.

Numerical Solution of Thermocapillary Flow

In this section, detailed micromechanics of droplet transport through the microchannel are analyzed with a finite volume formulation. The physical problem involves cyclic motion of the droplet in FIG. 3 and heat transfer through the solid (substrate), gas (air) and liquid (droplet) phases, simultaneously. Each phase has unique thermophysical properties. Heat transfer occurs by conduction through the silicon substrate and convection within the liquid, while a conjugate thermal boundary condition is needed at the substrate/droplet interface. Also, the thermal bridge that transports heat from the cyclic heat source to the droplet is encompassed within an air gap inside the domain (see FIG. 1). Considering this range of processes, the numerical simulation involves many complex interactions between the accelerating droplet and its surroundings.

Droplet transport in a closed microchannel is considerably different from most previous studies involving thermocapillary pumping in open microchannels or along micropatterned surfaces in that the external pressures upstream/downstream of the droplet are no longer equal. Large droplet velocities reported previously in open microchannels are not attainable, since small droplet displacements create adverse external pressures with a similar magnitude as the thermocapillary pressure. Also, commonly employed assumptions of steady-state Poiseuille flow are no longer realistic, because the droplet is continually accelerating and decelerating, when the heat source is cycled on and off. As a result, a full transient flow solution of the Navier-Stokes equations is needed to predict the internal velocity and pressure fields.

The following two-dimensional governing equations are used to predict the fluid flow and convective heat transfer within the closed microchannel, $$\frac{\partial \rho}{\partial t} + \nabla \cdot (\rho \vec{v}) = 0 \quad (11)$$

$$\frac{\partial (\rho \vec{v})}{\partial t} + \nabla \cdot (\rho u \vec{v}) = \nabla p + \nabla \cdot (\mu \nabla \vec{v}) + \dot{S}_v^m \quad (12)$$

$$\rho c_p \frac{\partial T}{\partial t} + \nabla \cdot (\rho \vec{v} c_p T) = \nabla \cdot (k \nabla T) + \dot{S}_T^m \quad (13)$$

These equations were solved with a finite volume method and a staggered grid formulation. In order to accommodate the moving droplet, an adaptive grid was used that matched the substrate grid with both the deforming meshes in the air regions and a sliding mesh for the droplet.

The numerical procedure for the solution of the fluid flow equations can be summarized by the following steps:

(1) calculate the new inlet and outlet boundary conditions for the droplet u-velocity, (2) using the current pressure field, solve the momentum equations for the u and v fields, (3) calculate the new pressure boundary conditions from current temperatures in the droplet, (4) solve the pressure correction equation [17] to obtain the new pressure field, (5) correct the u and v fields using the new pressure field.

(6) return to step (2) and repeat until the results converge within a specified tolerance.

In step (1), the value of the new u-velocity boundary condition matches the mass flow rate from the previous iteration. To new u boundary condition is estimated from $$u_{bc} = \frac{\sum_{i=1}^{i_{max}} \sum_{j=1}^{j_{max}} u_{i,j} \Delta y_{i,j}}{i_{max} H} \quad (14)$$

where the summation is performed over the number of rows and columns within the mesh. Unlike past methods with a uniform specified pressure at the droplet/air interface, the pressure is specified only in the wall node according to $$P = P^o + [(\overline{P_R} - \overline{P_L})^o - \Delta P_{spec}] \quad (15)$$

at the left edge of the droplet and P=0 at the right edge of the droplet. The previous calculations provide a more realistic pressure/velocity coupling at the interface.

The mass in both air regions of FIG. 3 is calculated from initial conditions. This mass remains constant throughout the simulations, but the volumes increase/decrease when the droplet moves. The air pressures are calculated based on each region's average temperature, volume and mass from the ideal gas law. The velocity of the air is assumed to vary linearly from zero at the wall to the bulk droplet velocity at the droplet/air interface.

The governing equation for temperature within the air phase excludes advection because control volume edges are moving at the speed of the air crossing them. The two-dimensional transient heat conduction equations are solved within the silicon substrate, thermal bridge and air regions. A thin air gap was placed between the thermal bridge and adjoining substrate, in order to reduce lateral heat losses through the thermal bridge. In this way, energy from the external source could be primarily transferred to the receding edge of the droplet within the microchannel, rather than laterally through the substrate.

The mesh within the substrate is aligned with the mesh in the air and droplet regions and is re-generated after each time step. After the mesh is re-generated, the temperature field within the substrate is transformed onto the new mesh. Although a rectangular mesh with Cartesian coordinates is adopted in the air and droplet regions, the algorithm could readily accommodate curvature of the droplet meniscus through a coordinate transformation at the droplet/air interface.

Unlike past studies, these numerical simulations allow detailed predictions of fluid flow and heat transfer within the micro-droplet. Since these simulations become time-consuming, the previously developed SF Model provides useful guidance in regards to overall trends in the system. For example, the model provides reasonable predictions regarding effects of geometrical changes, different working fluids and types of boundary conditions. In the following section, results from both theoretical and numerical formulations are presented and compared.

Results And Discussion

Predicted results are presented for two cases, namely: (i) specified droplet corner temperatures and (ii) varying edge temperatures based on cyclic heat input through the substrate. Microchannel heights of 0.5, 1 and 2 microns were studied. Properties and problem parameters for these cases are summarized in Table 2. In grid sensitivity studies, numerical results involving 20×20 and 20×45 mesh simulations exhibited grid independence, as the more refined mesh showed only slight improvement in solution accuracy.

TABLE 2

| Properties and Problem Parameters | |
|---|---|
| Property | |
| Density of Droplet | 998 kg/m³ |
| Dynamic Viscosity | 0.000959 kg/ms |
| Δt | 0.005 ms |
| L | 100 microns |
| H | 2 microns |
| nx | 20 |
| ny | 20/45 |
| ΔP | 1 Pa |

(i) Case 1: Specified Droplet Corner Temperatures

A specified droplet corner temperature was considered for validation purposes. In this case, the theoretical model (SF Model) implemented a specified temperature difference across the droplet, when evaluating the driving thermocapillary force on the droplet. The droplet's right and left corner temperatures in the theoretical model are specified from numerical predictions of the corner temperatures from the finite volume method (FVM). The droplet's corner temperatures were exported to the theoretical model from the numerical simulation after each time step.

Figure 5:
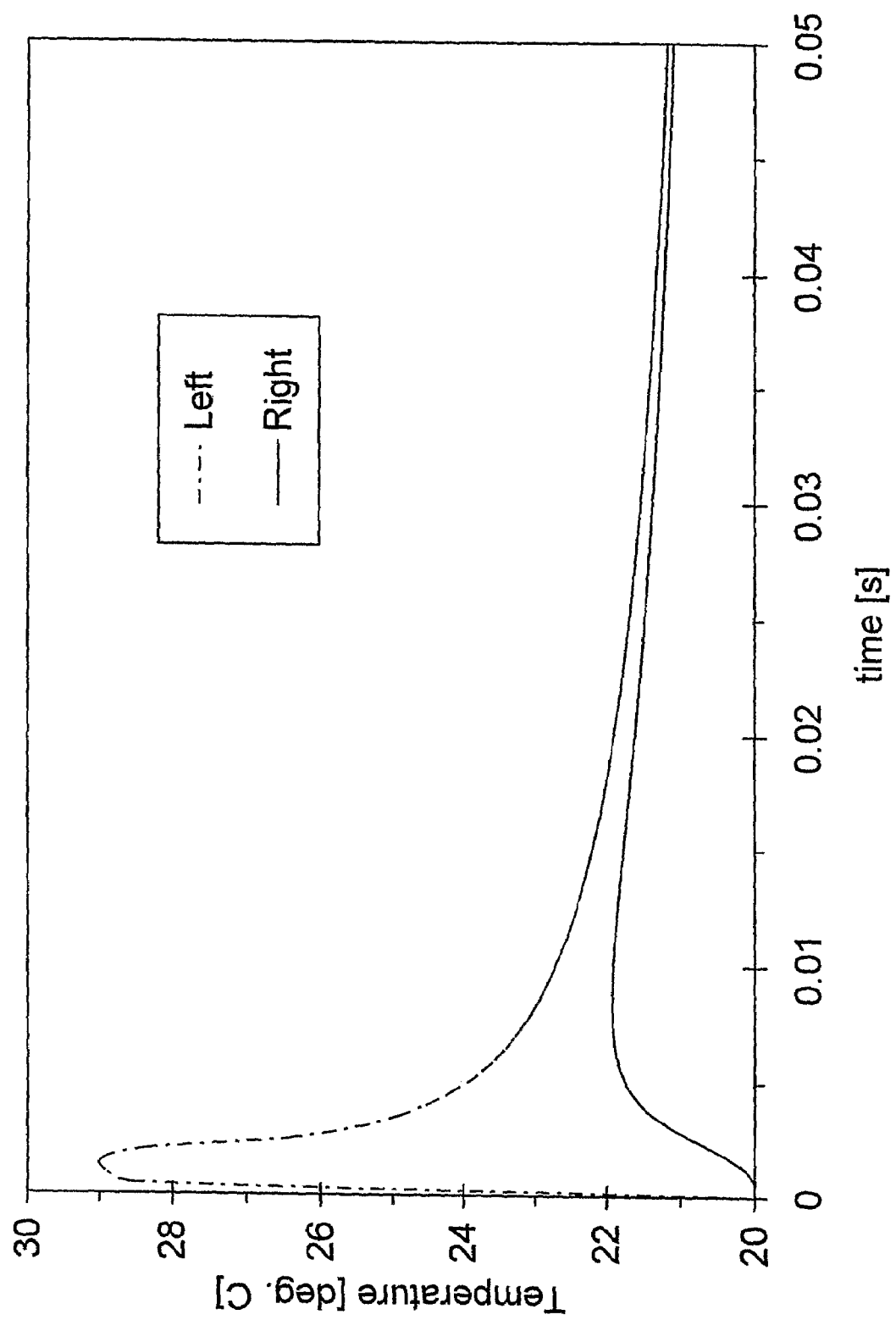
FIG. 5 is a graph showing predicted temperature at droplet/air interface.

The initial droplet temperature is 20° C. The thermal bridge is brought into contact with a body having a large thermal mass and a temperature of 30° C. In FIG. 5, the predicted change of the left and right corner temperature is depicted over time. The left edge temperature rises rapidly to approximately 29° C. The droplet then passes the thermal bridge, which is removed from contact with the heat source. At this time, the left edge of the droplet cools rapidly due to conduction through the air, droplet and substrate.

Figure 6:
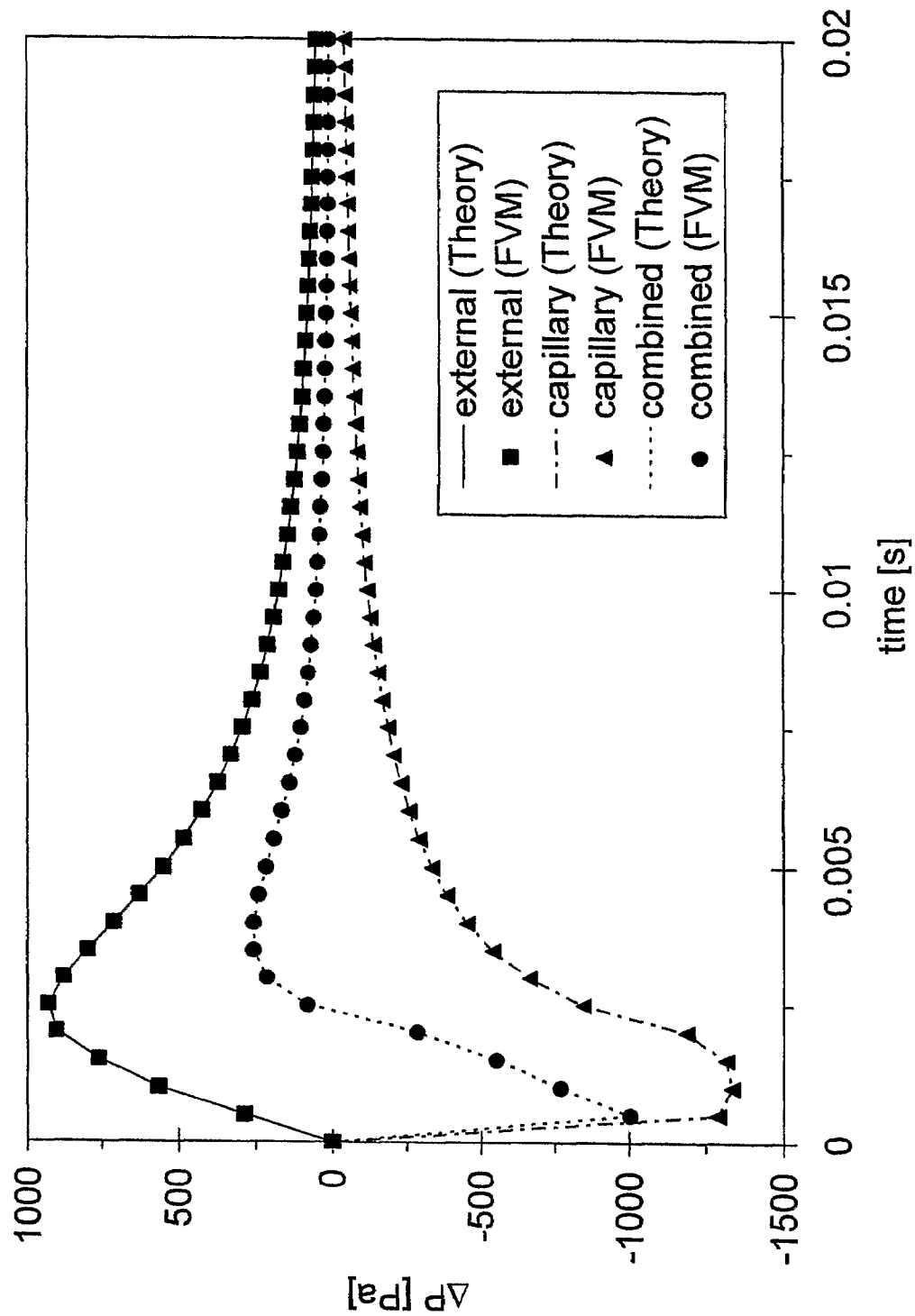
FIG. 6 is a graph showing predicted change of fluid pressure across droplet

The resulting temperature difference across the droplet produces a thermocapillary force. However, this force is offset by fluid friction along the walls of the microchannel and opposing pressure in the enclosed gas regions surrounding the droplet. These combined forces lead initially to a negative pressure difference during which the droplet is accelerating. After approximately 2.5 ms, the pressure difference changes from negative to positive, at which time the droplet starts decelerating (see FIG. 6). The pressure difference approaches zero as the droplet approaches its equilibrium position. Close agreement between the slug-flow theoretical model and the FVM predictions is illustrated in FIG. 6. A negative pressure difference characterized the favorable pressure gradient within the droplet, which drives fluid motion from left to right during the heating period within the microchannel.

Figure 7:
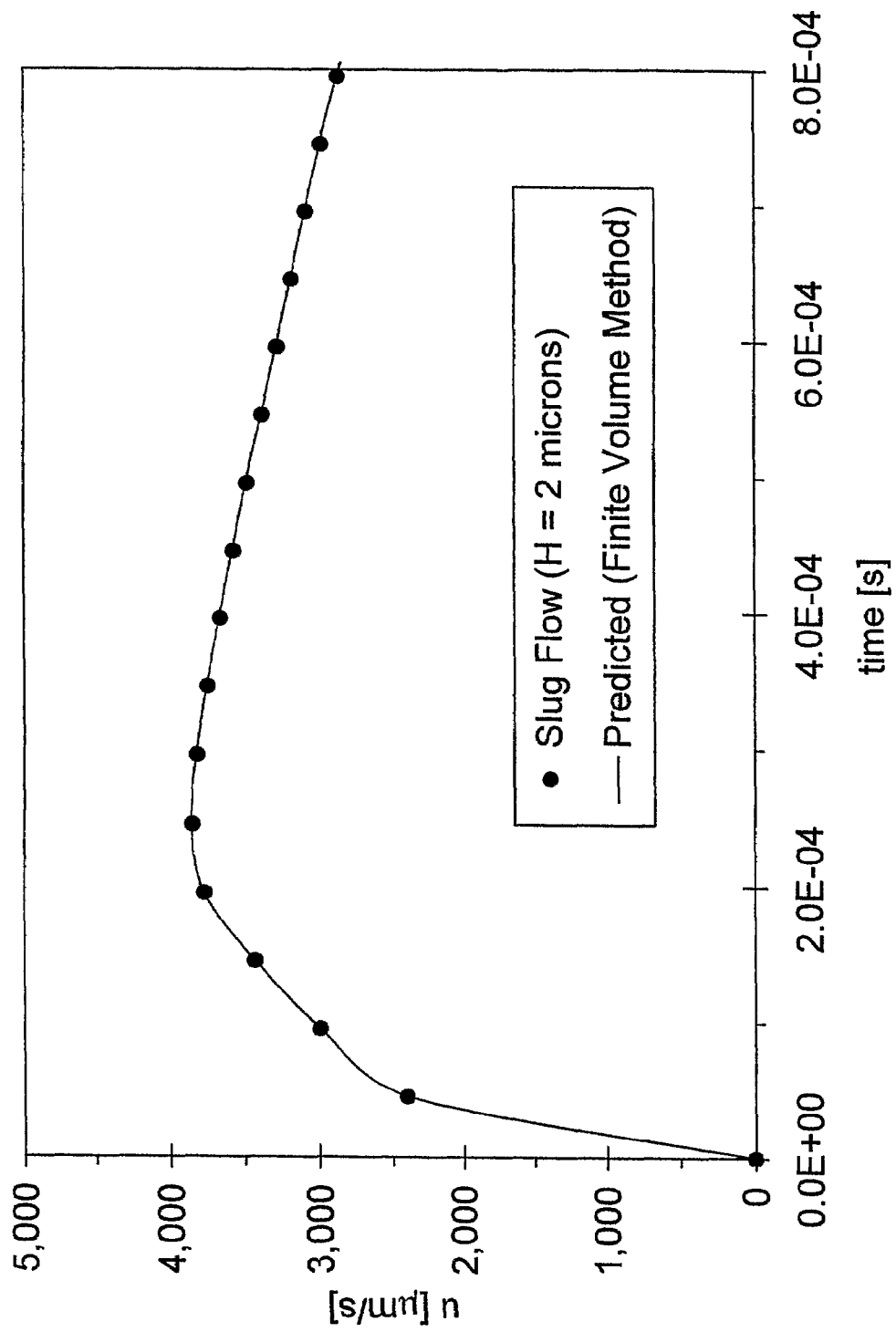
FIG. 7 is a graph showing transient change of droplet velocity in closed microchannel

The positive average droplet velocity in FIG. 7 was consistent with this favorable pressure gradient during the heating period. In FIG. 7, close agreement between the theoretical model and numerical predictions can be observed. The micro-droplet accelerates rapidly from its stationary position after heat is initially applied across the thermal bridge. After reaching a peak velocity after about 0.25 ms, the micro-droplet begins decelerating, due to the rising pressure within the compressed gas phase and frictional resistance along the walls of the microchannel. The net force on the micro-droplet is rightwards during the period of micro-droplet acceleration, as thermocapillary forces exceed frictional resistance and the opposing air pressure. But the force is re-directed leftwards when the opposing pressure becomes sufficiently high and droplet begins decelerating, although its earlier inertia sustains the micro-droplet velocity from left to right.

Figure 8:
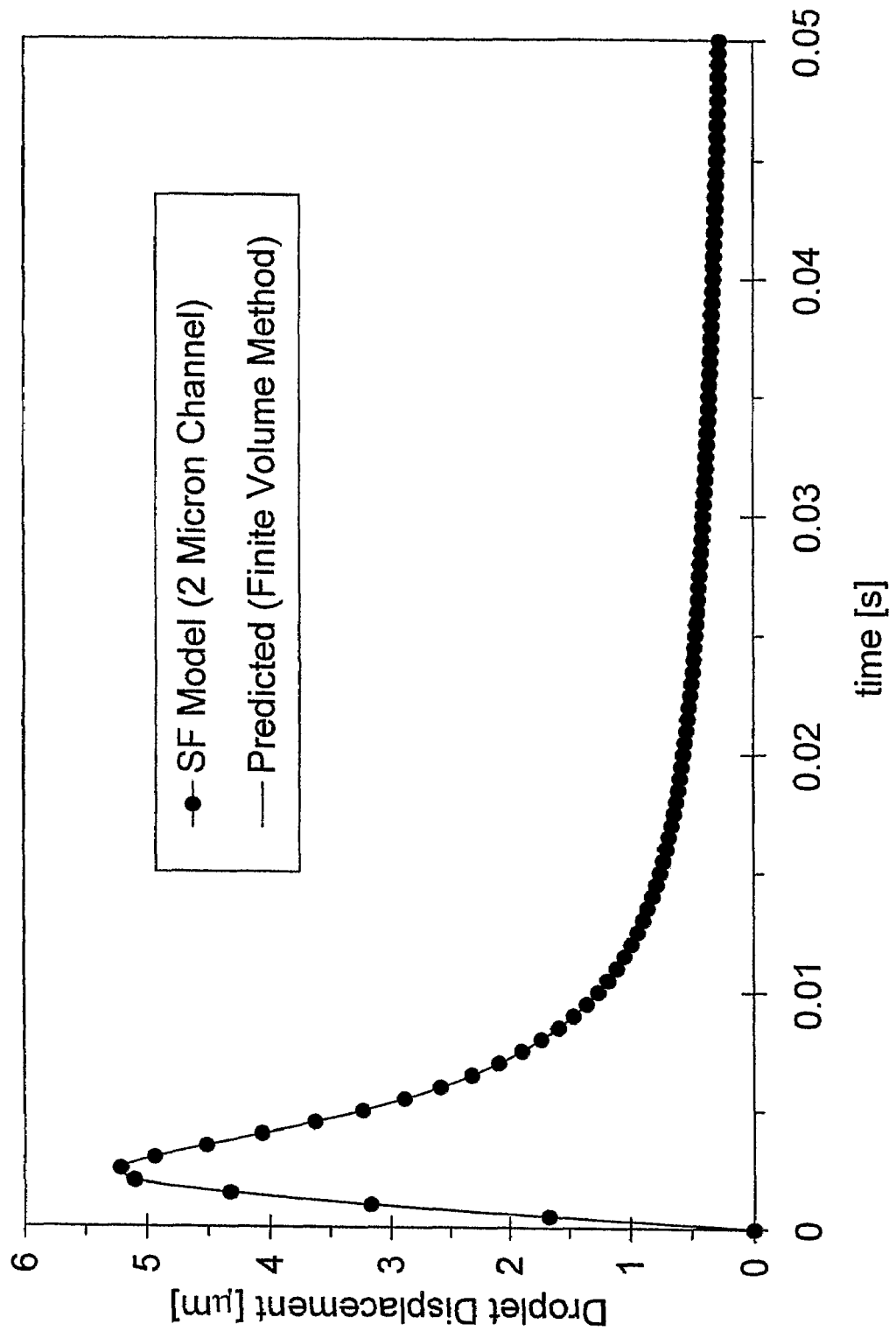
FIG. 8 is a graph showing predicted droplet displacement in the closed microchannel.

In FIG. 8, the droplet displacement is plotted against time. Close agreement between the SF Model and FVM predictions of the micro-droplet displacement is shown in FIG. 8. This close agreement suggests that the specified droplet end temperatures yield the proper driving force on the micro-droplet motion in the theoretical model. The peak displacement of the micro-droplet is about 5 microns, but this position could be readily controlled by varying the droplet size, gas volumes within the microchannel or the magnitude and duration of the heat input.

The cyclic heat source produces a rightward moving droplet during the heating period and a leftward droplet motion during the cooling period, when the cyclic heat source is turned off. It can be observed in FIG. 8 that the droplet returns towards its initial position. A new cycle of the droplet displacement could be initialized at any time during the return towards the equilibrium position. This ensures that the droplet transport could be sustained continually over time. It should be noted that cyclic heating/cooling is needed to allow the micro-droplet to return back to its initial position. If the heater is not turned off, the droplet would attain a new equilibrium position at which the thermocapillary driving force would match the opposing gas pressure.

(ii) Case 2: Varying Droplet Edge Temperatures with a Cyclic Heat Source

The previous case has provided useful validation of the formulation, as specified edge temperatures produce the proper net force and motion of the micro-droplet in the SF Model. Rather than specifying the droplet edge temperatures, a vertically oriented heater that spans the entire height of the domain and is aligned with the back of the droplet applies a heat flux of 5,000 kW/m$^2$. The initial droplet temperature is 20° C. Additionally, the thermal bridge has been removed to make the FVM closer to the domain of the theoretical model. From section II, this heat transfer formulation involves coupled heat conduction in the droplet/substrate and air/substrate phases during the heating period and a lumped capacitance approximation in the cooling period.

Figure 9:
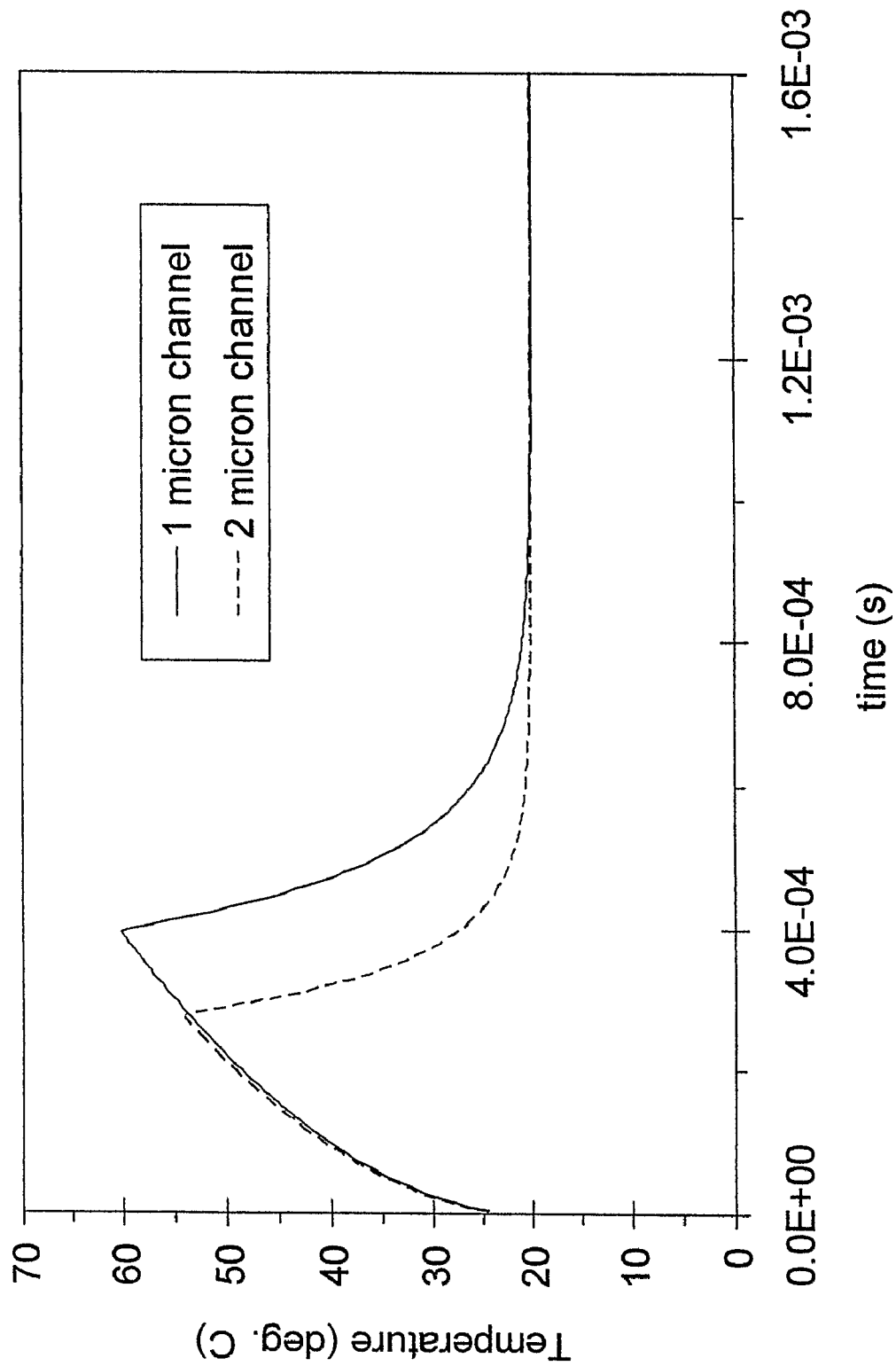
FIG. 9 is a graph showing predicted temperature at varying time steps.

In FIG. 9, predicted temperatures at the left end of the micro-droplet are illustrated. During this heating period, the temperature increases at the left end of the droplet and the droplet moves rightwards. Then it moves beyond the heated region, so the temperatures and thermocapillary forces decrease during the cooling period. During this transition between heating and cooling periods, a certain time delay occurs before the thermal wave propagates to the right end of the droplet by heat conduction. As a result, the temperature at the right end of the droplet increases less rapidly that that of the left end of the droplet during the heating period. After the droplet moves away from the heated surface and the heat source is removed, both temperatures decrease over time. The left edge begins cooling immediately as heat is conducted through the air and substrate, as well as towards the right end of the droplet, causing its temperature to increase. Then, the heat conduction rate decreases across the droplet and the right end of the droplet begins cooling due to conduction through the substrate and air. The maximum droplet acceleration occurs early before the air pressure increases appreciably.

Numerical simulations were performed with a time step of 0.05 µs. In FIG. 9, it can be observed that the peak temperature is higher in the case involving a smaller microchannel (1-micron channel). A specified heat input produces a larger temperature change when the droplet requires a longer heating period to travel a certain distance. It appears that the geometrical configuration of the microchannel can be manipulated, in order to produce a desired temperature difference and droplet motion, when a specified heat input is applied to the microchannel.

The predicted droplet displacement within 0.5 micron and 1 micron channels during a period of heating/cooling is illustrated in FIG. 10. The peak displacement is slightly larger for the smaller microchannel. But the larger microchannel reaches its peak value at an early time. For the larger microchannel, the frictional drag is smaller for a given droplet velocity. This allows the micro-droplet to accelerate faster and reach its peak displacement at an earlier time.

CONCLUSIONS

A new method of microfluidic transport with a stationary cyclic heat source was successfully designed for thermocapillary pumping of a micro-droplet in a closed microchannel. Thermocapillary forces generate droplet motion from left to right during the heating period, until the opposing pressure and fluid friction lead to droplet reversal in the cooling period. A finite volume method and theoretical formulation were developed to predict characteristics of the thermocapillary pumping microdevice. The droplet displacement reached about 6 microns, before pressure forces within the compressed air region led to reversal of the droplet motion. The receding edge of the micro-droplet reached about 60° C. (1-micron channel), but decreased thereafter when the receding edge of the droplet moved past the thermal bridge within the substrate. It was observed that a lower peak temperature was obtained at an earlier time within a larger microchannel, due to combined thermocapillary, friction and pressure forces on the micro-droplet. Close agreement between numerical and analytical predictions of droplet displacement were obtained, thereby providing useful validation of the numerical formulation.

The above-described embodiments of the present invention are intended to be examples only. Alterations, modifications and variations may be effected to the particular embodiments by those of skill in the art without departing from the scope of the invention, which is defined by the claims appended hereto.

REFERENCES

[1] P. Dutta, A. Beskok and T. C. Warburton, "Electroosmotic Flow Control in Complex Microgeometries", *Journal of Microelectromechanical Systems*, vol. 11, no. 1, pp. 36-44, 2002

[2] J. Voldman, M. L. Gray and M. A. Schmidt, "An Integrated Liquid Mixer/Valve", *Journal of Microelectromechanical Systems*, vol. 9, no. 3, pp. 295-302, 2000

[3] N. Vandelli, D. Wroblewski, M. Velonis and T. Bifano, "Development of a MEMS Microvalve Array for Fluid Flow Control", *Journal of Microelectromechanical Systems*, vol. 7, no. 4, pp. 395-403, 1998

[4] Kim, C. J., "Microfluidics Using the Surface Tension Force in Microscale", SPIE Symposium on Micromachining and Microfabrication, vol. 4177, pp. 49-55, Santa Clara, Calif., September, 2000

[5] Naterer, G. F., "Reduced Flow of a Metastable Layer at a Two-Phase Limit", *AIAA Journal*, vol. 42, no. 5, pp. 980-987, 2004

[6] Naterer, G. F., *Heat Transfer in Single and Multiphase Systems*, CRC Press, Boca Raton, Fla., 2002

[7] Tudos, A. J., Besselink, G. A. J., Schasfoot, R. B. M., "Trends in Miniaturized Total Analysis Systems for Point-of-Care Testing in Clinical Chemistry", *Lab on a Chip*, vol. 1, pp. 83-95, 2001

[8] Hirt, C. W., "*Thermocapillary Sample Problems*", Technical Report FSI-98-00-TN47, Flow Science Inc, Santa Fe, N.M., March, 1998

[9] DeBar, M. J., Liepmann, D., "Fabrication and Performance Testing of a Steady Thermocapillary Pump with No Moving Parts", pp. 109-112, Proceedings of the Fifteenth IEEE International Conference on Micro Electro Mechanical Systems, Las Vegas, Nev., Jan. 20-24, 2002

[10] M. Mala and D. Li, "Flow Characteristics of Water through Microtubes", *International Journal of Heat and Fluid Flow*, vol. 20, pp. 142-148, 1999

[11] Naterer, G. F., Glockner, P. S., Chomokovski, S. R., Richardson, G., Venn, G., "Surface Micro-Grooves for Near-Wall Exergy and Flow Control: Application to Aircraft Intake De-icing" (in press), *Journal of Micromechanics and Microengineering*, 2004

[12] W. Qu, M. Mala and D. Li, "Pressure-Driven Water Flows in Trapezoidal Silicon Microchannels", *International Journal of Heat and Mass Transfer*, vol. 43, pp. 353-364, 2000

[13] Naterer, G. F., "Adaptive Surface Micro-Profiling for Microfluidic Energy Conversion", *AIAA Journal of Thermophysics and Heat Transfer*, vol. 18, no. 4, pp. 494-501, 2004

[14] Glockner, P. S., Naterer, G. F., "Near-Wall Velocity Profile with Adaptive Shape Functions for Turbulent Forced Convection" (in press), *International Communications in Heat and Mass Transfer*, 2004

[15] Sammarco, T. S., Burns, M. A., "Thermocapillary Pumping of Discrete Drops in Microfabricated Analysis Devices", *AIChE Journal*, vol. 45, pp. 350-366, 1999

[16] Sammarco, T. S., Burns, M. A., "Heat Transfer Analysis of Microfabricated Thermocapillary Pumping and Reaction Devices", *Journal of Micromechanics and Microengineering*, vol. 10, pp. 42-55, 2000

[17] Patankar, S. V., *Numerical Heat Transfer and Fluid Flow*, Hemisphere Publishing Corporation, 1980

The invention claimed is:

1. A micro heat engine comprising:
   a substrate having a sealed microchannel, the microchannel having a first end and a second end;
   a liquid operatively contained within the microchannel between the first and second ends, thereby defining a first gas chamber adjacent the first end and a second gas chamber adjacent the second end;
   a thermal bridge in operative communication with the first gas chamber for providing a thermal gradient to the first gas chamber;
   a piezoelectric sensor in operative communication with the second gas chamber, the piezoelectric sensor responsive to a pressure change within the second gas chamber to induce a voltage across the piezoelectric sensor and a power output.

2. A micro heat engine as in claim 1 wherein the thermal gradient is a cyclic gradient.

3. A micro heat engine comprising a plurality of micro heat engines as defined in claim 1 electrically connected in series or in parallel.

4. A micro heat engine as in claim 1 wherein the substrate includes first and second sides, and wherein the second side includes a recess adjacent the second gas chamber for operatively retaining the piezoelectric sensor such that the recess and microchannel define a substrate thickness sufficient to enable operative deflection of the piezoelectric sensor.

5. A micro heat engine as in claim 1 wherein the liquid is any one of toluene or water.

6. A micro heat engine as in claim 1 wherein the substrate is a silicon wafer.

7. A micro heat engine as in claim 1 wherein the microchannel has a perpendicular side wall.

8. A micro heat engine as in claim 1 wherein the piezoelectric sensor is a solution cast piezoelectric membrane.

9. A micro heat engine as in claim 8 wherein the piezoelectric sensor is a formed from a solution of lead, zinc and titanium.

10. A micro heat engine as in claim 1 wherein the sealed microchannel includes a glass cap anodically bonded to the substrate.

11. A micro heat engine as in claim 1 wherein a plurality of interconnected microchannels is etched on a substrate.

12. A micro heat engine as in claim 1 further comprising a second piezoelectric sensor operatively connected to the first gas chamber.

13. A process for manufacturing a micro heat engine comprising the steps of:
   a) etching a microchannel having a first end and a second end on a first side of a substrate; etching a thermal bridge recess on a second side the substrate adjacent the first end of the microchannel; etching a piezoelectric recess on the second side of the substrate adjacent the second end of the microchannel; etching a droplet filling channel on the second side of the substrate;
   b) operatively attaching a thermal bridge to the thermal bridge recess, and piezoelectric sensor to the piezoelectric recess; and,
   c) filling and sealing the microchannel.

14. A process as in claim 13 wherein the piezoelectric sensor is solution cast within the piezoelectric recess.

* * * * *